US010490006B2

(12) United States Patent
Einberg et al.

(10) Patent No.: US 10,490,006 B2
(45) Date of Patent: Nov. 26, 2019

(54) BASED ON MOTION OF DEVICE, PERFORM OR LIMIT FEATURES

(71) Applicant: ASSA ABLOY AB, Stockholm (SE)

(72) Inventors: Fredrik Carl Stefan Einberg, Huddinge (SE); Daniel Berg, Sundbyberg (SE); Masha Leah Davis, Austin, TX (US)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 15/572,868

(22) PCT Filed: Jul. 29, 2016

(86) PCT No.: PCT/IB2016/001193
§ 371 (c)(1),
(2) Date: Nov. 9, 2017

(87) PCT Pub. No.: WO2017/017525
PCT Pub. Date: Feb. 2, 2017

(65) Prior Publication Data
US 2018/0144569 A1 May 24, 2018

Related U.S. Application Data

(60) Provisional application No. 62/198,214, filed on Jul. 29, 2015.

(51) Int. Cl.
*H04L 29/06* (2006.01)
*H04W 4/00* (2018.01)
(Continued)

(52) U.S. Cl.
CPC ......... *G07C 9/00309* (2013.01); *G06F 1/163* (2013.01); *G06F 1/1694* (2013.01);
(Continued)

(58) Field of Classification Search
CPC .. G07C 2009/0038; G07C 2009/00555; G07C 2009/00769; G07C 2009/0096;
(Continued)

(56) References Cited

U.S. PATENT DOCUMENTS 4,672,215 A * 6/1987 Howard ............. G06K 7/10881
219/121.62
7,706,778 B2  4/2010 Lowe
(Continued)

FOREIGN PATENT DOCUMENTS

DE        101 06 400 A1    8/2002
DE   10 2011 013 605 A1    9/2012
(Continued)

OTHER PUBLICATIONS

International Search Report for International Patent Application No. PCT/IB2016/001193, dated Nov. 7, 2016, 6 pages.
(Continued)

*Primary Examiner* — Dionne Pendleton
(74) *Attorney, Agent, or Firm* — Sheridan Ross P.C.

(57) ABSTRACT

Methods, devices, and systems are provided for performing and/or limiting features based on a determined motion associated with a portable device. When the portable device is determined to be in motion, a feature control application running on the portable device prevents at least one radio frequency identification (RFID) component of the device from communicating with RFID reading devices. When the portable device is still, or not in motion, the feature control application running on the portable device prevents the at least one RFID component of the device from communicating with RFID reading devices. Among other things, this feature control of a portable device can prevent theft of data in an access control system, credit payment system, and/or other data transfer system.

17 Claims, 5 Drawing Sheets

(51) Int. Cl.
*G06K 7/10* (2006.01)
*H04B 5/00* (2006.01)
*G07C 9/00* (2006.01)
*G06F 1/16* (2006.01)
*H04W 4/80* (2018.01)
*G06F 21/35* (2013.01)
*G06F 21/31* (2013.01)
*G06F 3/01* (2006.01)
*G06K 19/073* (2006.01)
*H04W 4/02* (2018.01)

(52) U.S. Cl.
CPC ............ *G06F 3/017* (2013.01); *G06F 21/316* (2013.01); *G06F 21/35* (2013.01); *G06K 7/10267* (2013.01); *G06K 7/10415* (2013.01); *G06K 19/07336* (2013.01); *G06K 19/07345* (2013.01); *G07C 9/00111* (2013.01); *H04L 63/0492* (2013.01); *H04L 63/083* (2013.01); *H04L 63/10* (2013.01); *H04W 4/027* (2013.01); *H04W 4/80* (2018.02); *G06F 2200/1636* (2013.01); *G07C 2009/0038* (2013.01); *G07C 2009/00769* (2013.01)

(58) Field of Classification Search
CPC ............ G07C 9/00309; G07C 9/00111; G07C 9/00071; G07C 9/00087; G07C 9/00174; G07C 9/00563; G07C 9/00571; H04W 4/027; H04W 4/80; H04W 12/00503; H04W 12/00508; H04W 12/04; H04W 12/06; H04W 12/08; H04W 88/02; H04W 12/00407; G06F 1/1626; G06F 1/1684; G06F 1/1698; G06F 21/31; G06F 21/35; G06F 21/36; G06F 2200/1637; G06F 3/0346; G06F 1/163; G06F 1/1694; G06F 21/316; G06F 21/34; G06F 3/017; G06F 2200/1636; G06F 21/6218; G06F 2221/2141; G06K 19/0716; G06K 19/07336; G06K 19/07345; G06K 7/10267; G06K 9/00885; G06K 7/10415; G06K 2207/1018; G06K 7/10366; G06K 7/10881; H04L 63/083; H04L 2463/121; H04L 63/0428; H04L 63/0492; H04L 63/062; H04L 63/0853; H04L 63/0861; H04L 63/0876; H04L 63/10; H04L 63/108; H04L 9/3226; H04L 2209/805; H04L 63/08; H04L 63/12; H04L 9/32; H04L 9/3215; H04M 1/67; H04M 1/72519; H04M 1/7253; H04M 2250/12; G08B 25/016; G08B 7/066; H04B 1/385; H04B 5/0062

See application file for complete search history.

(56) References Cited

U.S. PATENT DOCUMENTS

| | | | |
|---|---|---|---|
| 8,074,271 B2 | 12/2011 | Davis et al. | |
| 9,264,231 B2* | 2/2016 | Dean | G06F 21/35 |
| 9,832,206 B2* | 11/2017 | Mare | H04L 9/3215 |
| 2006/0005264 A1* | 1/2006 | Lin | G06F 1/263 |
| | | | 726/35 |
| 2008/0290985 A1 | 11/2008 | Vogedes et al. | |
| 2011/0287754 A1 | 11/2011 | Schlueter | |
| 2015/0187153 A1* | 7/2015 | Davis | G07C 9/00111 |
| | | | 340/5.52 |
| 2017/0111348 A1* | 4/2017 | Davis | G06K 19/07336 |
| 2019/0197853 A1* | 6/2019 | Trivelpiece | G08B 13/2402 |

FOREIGN PATENT DOCUMENTS

| | | |
|---|---|---|
| EP | 2 799 291 A1 | 11/2014 |
| EP | 2799293 | 11/2014 |
| FR | 2 798 691 A1 | 3/2001 |
| FR | 2 820 535 A1 | 8/2002 |

OTHER PUBLICATIONS

Written Opinion for International Patent Application No. PCT/IB2016/001193, dated Nov. 7, 2016, 9 pages.
International Preliminary Report on Patentability for International (PCT) Patent Application No. PCT/IB2016/001193, dated Feb. 8, 2018 11 pages.

* cited by examiner

Fig. 3

| Device Motion Determination | Motion Type Determination | Device Feature Control |
|---|---|---|
| In Motion (316) | M1: Constant | Do not look for Reader(s) |
| | M2: Intermittent | Do not look for Reader(s) |
| | M3: Pattern | Look for Reader(s) only when pattern matches access movement profile |
| | ⋮ | ⋮ |
| | MN: Other | Control Device Feature(s) based on rules, etc. |
| Not in Motion (320) | N1: Time = X | Do not look for Reader(s) |
| | N2: Time = Y | Do not open Door associated with a Reader |
| | N3: Time > Z | Do not scan for Reader(s) |
| | ⋮ | ⋮ |
| | NN: Other | Control Device Feature(s) based on rules, etc. |

Fig. 4

| Device Lighting Determination | Lighting Type Determination | Device Feature Control |
|---|---|---|
| Lit (416) | L1: Constant Light | Look for Reader(s) |
| | L2: Intermittent Light | Do not look for Reader(s) |
| | L3: Pattern of Light | Look for Reader(s) only when pattern matches access light profile |
| | ⋮ | ⋮ |
| | LN: Other | Control Device Feature(s) based on rules, etc. |
| Unlit (420) | U1: Dark Threshold | Do not look for Reader(s) |
| | ⋮ | ⋮ |
| | UN: Other | Control Device Feature(s) based on rules, etc. |

US 10,490,006 B2

BASED ON MOTION OF DEVICE, PERFORM OR LIMIT FEATURES

CROSS REFERENCE TO RELATED APPLICATIONS

The present application is a national stage application under 35 U.S.C. 371 of PCT Application No. PCT/IB2016/001193, having a filing date of Jul. 29, 2016 which claimed the benefits of and priority, under 35 U.S.C. § 119(e), to U.S. Provisional Application Ser. No. 62/198,214, filed on Jul. 29, 2015, entitled "Based on Motion of Device, Perform or Limit Features," the entire disclosure of both which are hereby incorporated by reference, in their entirety, for all that they teach and for all purposes.

FIELD

The present disclosure is generally directed to access control systems and more specifically to devices that are configured to provide access information for access control systems.

BACKGROUND

In general, access control systems rely upon lock and key principles to grant or deny access to a secure asset. Whether the keys are configured as physical keys presented to a mechanical lock or virtual keys presented to an access control unit, most keys include specific features or characteristics that are either recognized by or match lock features before access is granted to the asset. Some access control systems employ the use of various portable devices to maintain credential information for presentation to a reading device. The portable devices are generally configured to communicate with the reading device via wireless communication protocols.

One example of a portable device includes the radio frequency identification (RFID) device, such as a contactless smart card, key fob, or the like, to store credential information that can be used to gain access to an asset. When presented to a reader/interrogator, the smart card transmits the stored credential information for verification by the reader/interrogator. The reader/interrogator processes the credential information and determines if the smart card being presented is a valid smart card. If the reader/interrogator determines that credential information associated with the smart card is valid, then the reader/interrogator initiates any number of actions including allowing the holder of the smart card access to an asset protected thereby.

Another example of a portable device can include a wireless mobile device, such as a communication device, mobile phone, smartphone, etc. In this case, credential information may be stored in a memory associated with the wireless mobile device and communicated to a reading device using at least one wireless communication protocol available to the mobile phone.

SUMMARY

Recently, a new form of electronic pickpocketing has emerged targeting wireless data transfer devices. Examples of wireless data transfer devices may include, but are in no way limited to, any devices employing near field communication (NFC), radio frequency identification (RFID)(e.g., operating at 125 kHz, 13.56 kHz, etc.), Bluetooth® wireless communication, Bluetooth® Low Energy (BLE), Personal Area Network (PAN), Body Area Network (BAN), cellular communications, WiFi communications, and/or other wireless communications components. Devices, such as credit cards, identification cards, smartphones, portable computing devices, and even access cards, employ one or more of these wireless communications protocols and/or components. Using wireless data readers, thieves can now wirelessly-steal data from unsuspecting victims having a device that is in a wireless communication range of the readers.

Attempts have been made to thwart these types of thefts or data attacks, but most of these attempts rely upon reducing or interfering with a communication range of the wireless data transfer device. For example, some manufacturers provide a Faraday cage, wire mesh, metal casing, or other structure that is configured to house a wireless data transfer device. While the device is housed inside the Faraday cage, the device is unable to be read by a reading device. However, once the device is removed from the Faraday cage, or other structure, the device is vulnerable to attack and theft of data. Moreover, in the case of mobile phones or other communication devices having data stored thereon for wireless transfer (e.g., having an access control application, credit pay application, etc.) using a Faraday cage is impractical as it can cause an interruption to the communications ability of the mobile phone while housed therein.

It is with respect to the above issues and other problems that the embodiments presented herein were contemplated. In general, embodiments of the present disclosure provide methods, devices, and systems for performing and/or limiting features based on a determined motion associated with a portable device. In some embodiments, sensors associated with the portable device may provide data that may be used in determining whether the portable device is properly, or improperly, positioned for the wireless transfer of data. These sensors may include, but are in no way limited to, one or more gyroscopes, accelerometers, light sensors, image sensors, GPS sensors, microphones, touch sensors, buttons, biometric sensors, mobile device sensors, magnetic sensors, radio indoor positioning, location services (e.g., based on environmental landscape, etc.), and the like. In any event, based on the information provided by the one or more sensors (e.g., motion, light, etc.) one or more features of the portable device may be controlled. These features may include controlling the transfer of data, the interrogation of reading devices, scanning for interrogating devices, activation/deactivation, opening and/or closing communication ports, providing power, responding to interrogations, and/or the like. In some embodiments, the portable device may be a portable access control device, include an access control application configured to provide access control information via at least one wireless transfer protocol, and/or include one or more wireless access control components.

The portable device may be configured as a mobile communication device (e.g., a phone, smartphone, tablet, portable computer, etc.), a wearable device (e.g., a device that is configured to be worn by a user, etc.), an access card (e.g., RFID card, NFC card, Bluetooth® card, etc.) or the like. In any event, the portable device may include any physical electronic device having a processor, a memory, and a communications module or antenna.

In one embodiment, active credentials (e.g., mobile phones, tablets, other portable devices, etc.) may include one or more modes of operation. The portable device may scan for reading devices and/or the reading device may scan for portable devices (e.g., credentials, etc.). It is at least one aspect of the present disclosure that an absence of motion (e.g., at the portable device, etc.) may "switch off" the advertising or the fact that the portable device would be visible (e.g., able to be scanned and/or detected, etc.) to a reading device or an attacker.

Depending on the particular embodiment, one or more communications may be limited, terminated, activated, deactivated, and/or combinations thereof. For example, all of the communication of a portable device may be prevented from operating, or may be terminated in response to a determined motion of the portable device. In one embodiment, for instance, where the RFID interfaces of a portable device may be used by multiple services, a particular service (e.g., the visibility or scanning of the particular service, etc.) may be controlled in response to a particular determined motion of the portable device.

In some embodiments, a reading device may advertise and/or broadcast a signal that one or more portable devices may be capable of scanning. In this instance, the portable device may be considered the primary or central device with the reading device as a secondary or non-central device. It should be appreciated that the feature control embodiments described herein can at least apply to one or more scenarios where the portable device is configured to search for reading devices, receive broadcast or advertised signals from a reading device, respond to interrogation signals (e.g., from reading devices, etc.), and/or combinations thereof, and the like. In some embodiments, once a communication channel is established between devices (e.g., a portable device and a reading device, etc.), the protocols, feature controls, and other behavior may be used independent of what particular device established the initiation, communication, and/or channel. For example, with NFC, the reading device may establish the communication. In any event, the feature control embodiments described herein can at least allow for the control of device features for both directions of channel initiation (e.g., from reader-to-portable and/or portable-to-reader).

It is an aspect of the present disclosure that wearable credentials (e.g., smart watches, smart phones, etc.) may be peripheral credentials using wireless communications such as Bluetooth Low Energy (BLE), or similar wireless communications protocol, for example. These peripheral credentials may advertise their precedence periodically and a lock, or other reading device, may scan for the peripheral credentials. Similar to the one or more modes of operation described above, embodiments of the present disclose can support at least one of these multiple modes of operation.

By way of example, when a credential has been still (e.g., on a desk, in an office, etc.) for some time, the wireless communications (e.g., BLE capabilities, RF communications, etc.) may be shut off. In one example, the advertisement rate of the credential may be slowed down significantly from a normal advertising rate. When slowing down the advertising rate of the credential, an advertising packet may indicate a "still" movement status of the credential. In any event, this control of communications can offer the benefits of saving power used by the credential, minimizing risk of a wrong credential opening a door (e.g., inside credentials, etc.), and can lead to less communication clutter in the RF space (e.g., where many credentials are lying still, etc.) which can in turn reduce a communication time at a door between a reading device and a non-still credential. Limiting the number of credentials advertising (e.g., advertising capabilities or services of the credentials, etc.) can prevent any nearby reading devices from being flooded with information. Among other things, this approach of reducing information transmission or communication clutter in the RF space can ensure that any credentials actually wishing to access a particular asset via the reading device are allowed to communicate (between the credential and the reading device) without significant communication delays or loss.

In one embodiment, a credential may be deactivated by stopping, ceasing, or preventing wireless communications (e.g., BLE or other) scanning overall. In some embodiments, the credential may be deactivated by stopping, ceasing, or preventing the ability of the reader to "listen" for reading devices. In some embodiments, the credential may be deactivated from responding to a select message, etc. In cases where the communication is in the opposite direction (e.g., from the portable device to the reading or other devices, etc.), the portable device may be stopped or prevented from broadcasting overall. In one embodiment of the opposite communication direction scenario, the portable device may be prevented or stopped from broadcasting specific characteristics. Additionally or alternatively, in the opposite communication direction scenario, the credential may be deactivated from responding to a select message, etc.

As another example, when a credential is moving, the advertisement of the credential may be on (e.g., set to "on," etc.) and doors can be opened. An additional check may be implemented requiring the credential to be rather still, or have little detectable motion, after authentication has completed at the door. This requirement can prevent a door from opening if a user is simply passing by a door that the user does not intend to open. In some embodiments, the user may be required to stop or pause for some time to show an intent of the user in opening the door. Aspects of the present disclosure include shutting off, or altering, the wireless communications (e.g., BLE or other communications, etc.) ability of a credential when a detected motion of the credential (or lack thereof) is checked for a particular pattern (e.g., motion followed by a still period, etc.). This check may occur before an authentication has been performed, after an authentication has been performed, and/or combinations thereof. Additionally or alternatively, a detected trend in a received signal strength indication (RSSI) may be used as a check for altering the communications ability of a credential.

In some embodiments, information provided by the portable device may be used in determining whether to control features of the portable device. For example, the portable device may provide a geographical location and/or position of the portable device. In one embodiment, this location may be based on Global Positioning System (GPS) data provided by a GPS module of the portable device. In some embodiments, the location of the portable device may be provided based on cell tower data, WiFi information, iBeacon information, and/or some other location information provided by a location module of the portable device. The control of features associated with the portable device may be based at least partially on determining a difference, or distance, between the location of the portable device and the location of a reading device. For example, once the distance passes a specific threshold value, the portable device may prevent access control information, or other data, from being transmitted wirelessly. In some embodiments, the location of the portable device may be obtained from an Indoor Positioning System (IPS), for example, based on trilateration RSSI or time of flight information from radio communication with the portable device and several fixed IPS readers or anchor. This IPS functionality may be integrated into one or more access control readers.

In one embodiment, a movement and/or motion of the portable device may be used to determine whether to perform or limit features associated with the portable device. For instance, a portable device may be more vulnerable to attack and/or theft of data when the device is constantly looking for reading devices. Looking for devices may include, but is in no way limited to, scanning for devices, searching for devices via a wireless communication channel, sending a wireless communication message to be received by one or more devices in a communication range of the portable device, broadcasting a search signal or message across a wireless communication medium and/or channel on the medium, etc., and/or combinations thereof. When a device is moving a user associated with that device is most likely not looking to provide access control information or a transfer of data. However, a thief may sidle up to a user having this type of portable device while walking in a crowd and attempt to read information from the portable device using a wireless reading device. This type of attempted theft may be thwarted by a motion analysis and feature control of the portable device as described herein.

By way of example, if the portable device is determined to be in motion, or a particular type of motion, then the portable device may determine to prevent looking for reading devices (e.g., not scanning for readers, etc.). In one embodiment, if the portable device is sitting still (e.g., with no motion, etc.), then the portable device then the portable device may determine that there is no need to look for reading devices. Additionally or alternatively, when the portable device is sitting still, then the portable device may be configured to prevent transmitting any signal configured to open a door associated with a reading device (e.g., if sitting still, do not open the door). In some embodiments, if the portable device is determined to be sitting still for longer than a predetermined amount of time, then the portable device may be configured to prevent the portable device from scanning for reading devices.

Motion may include at least one of a constant movement, intermittent movement, a movement pattern (e.g., a type of movement detected, followed by another type of movement detected, followed by yet another type of movement detected, etc.), or other movement type of the portable device over time. In one example, a movement pattern may include a movement associated with walking, followed by a movement associated with slowing down and stopping, followed by a movement associated with transitioning the portable device from a "carrying" position to a "presenting" position, etc. In this example, the movement pattern indicates that the portable device should allow looking for reading devices and/or allow a response to an interrogation from readers and/or other interrogating devices (e.g., the user may wish to perform an unlock operation or a transfer of information, etc.). In any event, the motion may be measured relative to a particular reference, for example in the form of a force, direction, orientation, gravity vector, position, location, and/or combinations thereof. In some cases, the motion may be measured using one or more sensors associated with the portable device. These sensors may include, but are in no way limited to, one or more gyroscopes, accelerometers, image sensors, GPS sensors, microphones, other portable or mobile device sensors, and the like. In some embodiments, a particular motion of the portable device may be associated with a movement of a user associated with the portable device. In this example, the portable device may determine that the user is walking with the portable device. Continuing this example, an application running via the portable device may receive this movement information and determine that the walking motion may prevent any interrogation of, or interrogation response to, a reading device. Among other things, the portable device in this example may be prevented from looking for a reading device.

In some embodiments, a particular movement of the portable device may be used to activate or deactivate a particular feature, or combination of features, of the portable device. These features may include looking for readers, transmitting information, etc. For instance a user may remove a portable device from a pocket and wave, shake, or otherwise translate the portable device before a reading device in a particular pattern or movement (e.g., a circular path, a cyclical path, a linear movement path, a nonlinear movement path, combinations thereof, and/or the like). Upon determining that the pattern substantially matches a feature control pattern stored in memory, the portable device may control the feature(s) of the device in accordance with the stored pattern. In some embodiments, the pattern may be customized, stored, and even associated with a particular user. In one embodiment a particular movement pattern may be used to provide an access control signal to a reading device. In another embodiment, the pattern of motion may initiate an application, or activate a feature of the application, running on the portable device.

The portable device may determine to provide similar or different feature controls based on a lack of motion associated with the portable device. When a portable device is determined to have no motion associated therewith, a time (e.g., corresponding to a total amount of time that the device has remained stationary, etc.) may be used to determine one or more features of the device to control. Various time thresholds may be set, or predetermined, to provide different device feature controls. For example, if a device remains still (e.g., not moving or otherwise in motion within a particular movement threshold, etc.) for a period of time greater than a threshold value, the portable device may be prevented from performing scanning for any reading devices. Additionally or alternatively, as the period of time associated with the lack of motion increases, the portable device may determine to limit one or more other features of the device (e.g., powering down, terminating applications, locking the device, reporting a state of the device via a wireless communication, reporting that the device is lost, communicating a location of the device, initiating an alarm, etc.).

In some embodiments, other sensors associated with the portable device may be used to determine whether features of the device, and/or an application running via the device, should be performed or limited. In one embodiment, a light or image sensor associated with the portable device may be employed by a feature control application running on the portable device to control a device feature of the portable device. By way of example, modern smartphones include at least one light sensor and/or image sensor to, among other things, control screen brightness, power provided to a screen, record images, and/or the like. By recruiting or actively using information collected via the light sensor, the feature control application running on the portable device may determine that the portable device is located in a pocket, purse, bag, or another concealed location (e.g., when the light measured by the sensor reports a dark, or low light, threshold value is met, etc.). Based on this information the feature control application can determine that the user associated with the portable device is most likely not looking to provide access control information or a transfer of data via the portable device. In this scenario, the portable device may be configured to prevent the any scanning, or looking, for reading devices. Conversely, the light sensor may provide information that a lit condition, or lighting threshold value, is met (e.g., when the portable device is removed from a concealed environment, etc.). This condition may indicate that a user wishes to provide a transfer of information via the portable device by removing it from a concealed environment. As such, the feature of scanning or looking for reading devices may be activated, enabled, or otherwise not limited from operating on the portable device.

It should be appreciated that the information provided by the various sensors described herein may be used alone or in combination to make a feature control decision by the portable device. For instance, lighting information (provided by the light sensor) may be used in combination with motion information (determined from one or more movement and/or motion sensors) to make a control decision for features of the portable device. By way of example, a device may be determined to be in motion and in the dark (e.g., in a concealed environment, pocket, etc.). Continuing this example, the device may still detect motion but then detect light and then a sudden lack of motion. This scenario and combination of detected information may correspond to a user who is walking up to a reading device, removing the device from a pocket, and presenting the device to a reading device (or proximate area). In this scenario, the feature control application running on the portable device may determine to activate a scanning for reading devices or transfer information. This determination may be made in response to analyzing the combination of information and identifying that the combination of information corresponds to an action of the user presenting the portable device to a reading device. In some cases, magnetic sensors, radio indoor positioning, location services (e.g., based on environmental landscape, etc.), and other sensors as described herein may be employed in determining to make the feature control decision.

As provided herein, the portable device may be configured to operate in conjunction with one or more other devices. In some embodiments, the other devices may be provided by a manufacturer different from the portable device.

The portable device may include its own power source or use power provided from another source. In some embodiments, the portable device may include electronics that can be powered by a reading device. One example of such electronics may be a portable device having RFID components, (e.g., a capacitor, antenna, etc.). In this example, when the portable device is presented within an RFID field provided by the reading device, the reading device provides energy via the RFID field that can be stored in the capacitor of the portable device.

The term "computer-readable medium," as used herein, refers to any tangible data storage medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein, "credential information" is any data, set of data, encryption scheme, key, and/or transmission protocol used by a particular device (e.g., a "credential device") to authenticate and/or verify its authenticity with a reader, and/or interrogator.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 3 is a diagram of an embodiment of a data structure for storing information about a portable device feature control;

FIG. 4 is a diagram of an embodiment of a data structure for storing information about a portable device feature control;

DETAILED DESCRIPTION

Copyright and Legal Notices

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
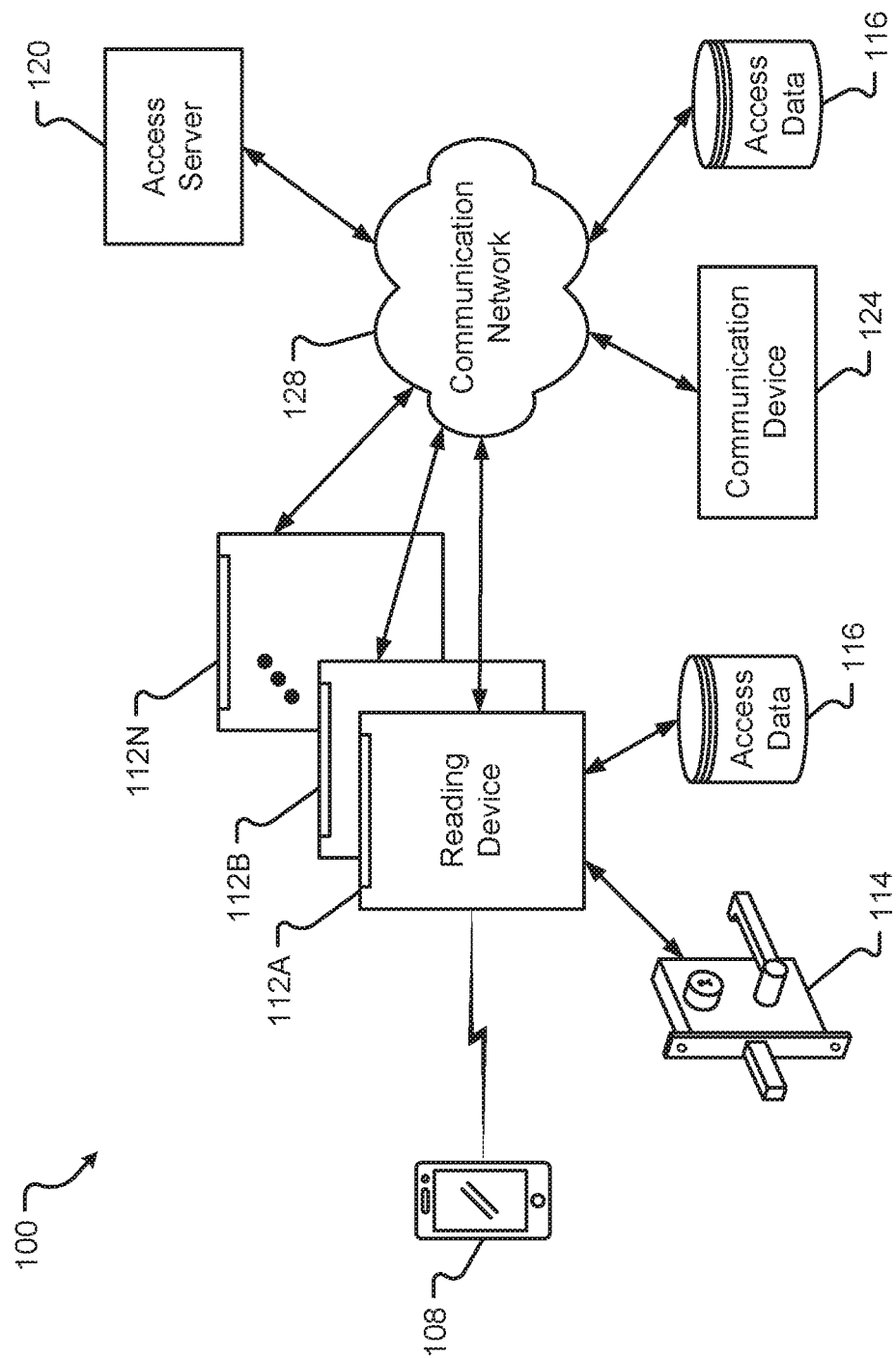
FIG. 1 is a diagram depicting an access control system in accordance with embodiments of the present disclosure.

FIG. 1 is a diagram depicting an access control system 100 in accordance with embodiments of the present disclosure. In one embodiment, the access control system 100 comprises at least one reading device 112 and at least one portable device 108. The reading device 112 may include an access data memory 116. The access data memory 116 may be configured to store access information, identification data, rules, program instructions, and/or other data associated with performing access operations of an access control system 100. In some embodiments, the reading device 112 may be configured to communicate with an access data memory 116 across a communication network 128. The access data memory 116 may be located remotely, locally, and/or locally and remotely, from the reading device 112.

The portable device 108 may be configured to communicate with a reading device 112 across one or more wireless communication connections. These one or more wireless communication connections can include communications via at least one of conventional radio protocols, proximity-based wireless communication protocols, Bluetooth™, BLE, infrared, audible, NFC, RF, and other wireless communication networks and/or protocols. In some cases, communications between the portable device 108 and the reading device 112 may be established automatically when the portable device 108 enters an active zone of an interrogating reading device 112. In one embodiment, the active zone of the reading device 112 may be defined as a three-dimensional space where the intensity of RF signals emitted by the reading device 112 exceeds a threshold of sensitivity of the portable device 108 and the intensity of RF signals emitted by the portable device 108 exceeds a threshold of sensitivity of the reading device 112.

In some embodiments, the portable device 108 may be configured to communicate with a reading device 112 across a communication network 128. The communication network 128 can include communication via at least one of conventional radio networks, wireless communication networks, Zig-Bee, GSM, CDMA, WiFi, and/or using other communication networks and/or protocols as provided herein.

In one embodiment, authentication may be required between the portable device 108 and the reading device 112 before further communications are enabled. The further communications may provide communications in which access control information (e.g., keys, codes, credentials, etc.) are shared. In some embodiments, the authentication may be provided via one-way or mutual authentication. Examples of authentication may include, but are not limited to, simple authentication based on site codes, trusted data formats, shared secrets, and/or the like. As can be appreciated, access control information is more sensitive and may require more involved validation via, for example, an encrypted exchange of access control information.

In some embodiments, the reading device 112 may be configured to request access control information from the portable device 108. This information may be used to validate the portable device 108. Validation may include referring to information stored in access data memory 120 or some other memory associated with the portable device 108. Typically, a reading device 112 is associated with a particular asset (e.g., a door protecting access to a secure room, a computer lock protecting sensitive information or computer files, a lock on a safe, and the like). In one embodiment, the portable device 108 may be validated via one or more components of the access control system 100. Once the portable device 108 is authenticated, credential information associated with the portable device 108 may be validated. During this process, the reading device 112 may generate signals facilitating execution of the results of interrogating the portable device 108 (e.g., engages/disengages a locking mechanism, allows/disallows movement of a monitored article, temporarily disables itself, activates an alarm system, provides access to a computer system, provides access to a particular document, and the like). Alternatively, the access server 120 may generate such signals.

In accordance with embodiments of the present disclosure, the reading device 112 may collect access control information associated with the portable device 108 before an access control decision can be made. For example, the reading device 112 may require credential information stored on the portable device 108 to validate the portable device 108. The validity of the portable device 108 may be based on the validity of an associated movement, context, etc., and/or combinations thereof. In one embodiment, upon validating credential information stored on the portable device 108, the reading device 112 generates signals facilitating execution of the results of interrogating the portable device 108 (e.g., engages/disengages a locking mechanism, allows/disallows movement of a monitored article, temporarily disables itself, activates an alarm system, provides access to a computer system, provides access to a particular document, and the like). As provided above, the access server 120 may generate such signals.

The access server 120 may include a processor, a memory, and one or more inputs/outputs. The memory of the access server 120 may be used in connection with the execution of application programming or instructions by the processor, and for the temporary or long term storage of program instructions and/or data. As examples, the memory may comprise RAM, DRAM, SDRAM, or other solid state memory. Additionally or alternatively, the access server 120 may communicate with an access data memory 116. Like the memory of the access server 120, the access data memory 116 may comprise a solid state memory or devices. The access data memory 116 may comprise a hard disk drive or other random access memory.

In some embodiments, the reading device 112 may be configured to communicate with one or more devices across a communication network 128. For example, the reading device 112 may communicate with a portable device 108 across the communication network 128. Among other things, this communication can allow for back-end authentication and/or provide notifications from the reading device 112 to the portable device 108. The communication network 128 may comprise any type of known communication medium or collection of communication media and may use any type of protocols to transport messages between endpoints. The communication network 128 may include wired and/or wireless communication technologies. The Internet is an example of the communication network 128 that constitutes an Internet Protocol (IP) network consisting of many computers, computing networks, and other communication devices located all over the world, which are connected through many telephone systems and other means. Other examples of the communication network 128 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, RS-232, similar networks used in access control systems between readers and control panels, and any other type of packet-switched or circuit-switched network known in the art. In addition, it can be appreciated that the communication network 128 need not be limited to any one network type, and instead may be comprised of a number of different networks and/or network types. Moreover, the communication network 128 may comprise a number of different communication media such as coaxial cable, copper cable/wire, fiber-optic cable, antennas for transmitting/receiving wireless messages, and combinations thereof.

In some embodiments, the access control system 100 may include at least one communication device 124. A communication device 124 may include, but is not limited to, a mobile phone, smartphone, smart watch, soft phone, telephone, intercom device, computer, tablet, mobile computer, alarm, bell, notification device, pager, and/or other device configured to convert received electrical and/or communication signals. In one embodiment, the communication device 124 may be used to receive communications sent from the portable device 108 via the reading device 112.

Figure 2:
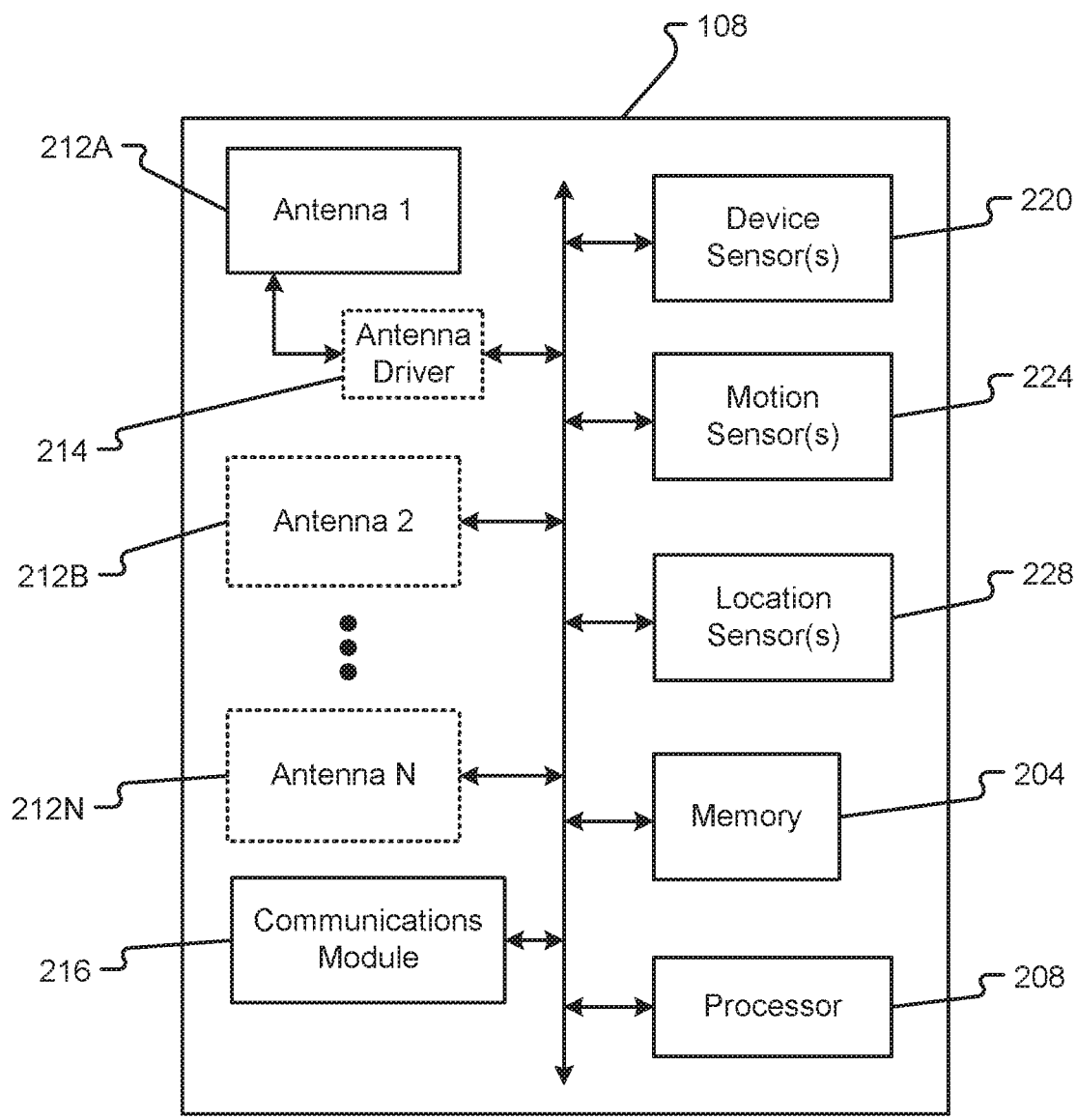
FIG. 2 is a block diagram depicting a portable device or components thereof in accordance with embodiments of the present disclosure.

Referring now to FIG. 2, a block diagram depicting a portable device 108 is shown in accordance with embodiments of the present disclosure. The portable device 108 may include one or more components, such as, a memory 204, a processor 208, an antenna 212A-N, a communications module 216, a device sensor 220, a motion sensor 224, and a location sensor 228. In some embodiments, the portable device 108 may further include a power module. The processor 208 may be an application specific integrated circuit (ASIC), microprocessor, programmable controller, or the like.

The memory 204 of the portable device 108 may be used in connection with the execution of application programming or instructions by the processor 208, and for the temporary or long term storage of program instructions and/or data. The memory 204 may contain executable functions that are used by the processor 208 to run other components of the portable device 108. In one embodiment, the memory 204 may be configured to store credential information. For instance, the credential information may include, but is not limited to, unique identifications, manufacturer identification, passwords, keys, encryption schemes, transmission protocols, and the like. In some embodiments, the memory 204 may be configured to store configuration information, identification information, authentication information, and/or the like. In some embodiments, the memory 204 may comprise volatile or non-volatile memory and a controller for the same. Non-limiting examples of memory 204 that may be utilized in the portable device 108 include RAM, ROM, buffer memory, flash memory, solid-state memory, or variants thereof.

The processor 208 may correspond to one or many microprocessors that are contained within the housing of the portable device 108 with the memory 204. In some embodiments, the processor 208 incorporates the functions of the user device's Central Processing Unit (CPU) on a single Integrated Circuit (IC) or a few IC chips. The processor 208 may be a multipurpose, programmable device that accepts digital data as input, processes the digital data according to instructions stored in its internal memory, and provides results as output. The processor 208 implements sequential digital logic as it has internal memory. As with most known microprocessors, the processor 208 may operate on numbers and symbols represented in the binary numeral system.

The one or more antennas 212A-N may be configured to enable wireless communications between the portable device 108 and a reading device 112, a communication device 124, and/or some other device. As can be appreciated, the antenna(s) 212A-N may be arranged to operate using one or more wireless communication protocols and operating frequencies including, but not limited to, Bluetooth®, NFC, Zig-Bee, GSM, CDMA, WiFi, RF, and the like. By way of example, the antenna(s) 212A-N may be RF antenna(s), and as such, may transmit RF signals through free-space to be received by a reading device 112 having an RF transceiver.

In some embodiments, the portable device 108 may include a power module. The power module may be configured to provide power to the parts of the portable device 108 in order to operate. The power module may store power in a capacitor of the power module. In one embodiment, electronics in the power module may store energy in the capacitor and turn off when an RF field is present. This arrangement can ensure that energy is presented to the portable device 108 minimizing any effect on read distance. Although the portable device 108 may be configured to receive power passively from an electrical field of a reading device 112, it should be appreciated that the portable device 108 may provide its own power. For example, the power module may include a battery or other power source to supply power to parts of the portable device 108. The power module may include a built-in power supply (e.g., battery) and/or a power converter that facilitates the conversion of externally-supplied AC power into DC power that is used to power the various components of the portable device 108. In some embodiments, the power module may also include some implementation of surge protection circuitry to protect the components of the portable device 108 from power surges.

The portable device 108 may include a communications module 216 that is configured to communicate with one or more different systems or devices either remotely or locally to the portable device 108. Thus, the communications module 216 can send or receive messages to or from reading devices 112, communication devices 124, access servers 120, access control systems, or other systems and/or devices. In some embodiments, the communicated information may be provided to, or exchanged with, other components within the portable device 108.

Embodiments of the portable device 108 may include at least one device sensor 220. Among other things, the device sensor 220 may be configured to detect a state or context of the portable device 108. In some embodiments, the portable device 108 may employ one or more sensors 220, 224, 228 that are configured to detect information corresponding to a state of the portable device 108. The device sensors 220 may include, but are not limited to, one or more biometric sensors (e.g., heart rate, body temperature and/or heat signature, blood pressure, etc.), capacitive sensors, light sensors, image sensors, temperature sensors, pressure sensors, contact sensors, magnetic sensors, radio indoor positioning sensors, location services sensors and/or devices, combinations thereof, and the like. It is an aspect of the present disclosure that the processor 208 of the portable device 108 may receive the sensor information and determine whether the portable device 108 is in motion, still, lit or unlit, etc., and/or combinations thereof.

The motion sensors 224 may include one or more of a gyroscope, accelerometer, transducer, and/or other mechanical detection component that are each configured to detect a force and/or motion associated with the portable device 108. This detected motion of the portable device 108 may be compared, via the processor 208 of portable device 108, to known motion profiles stored in the memory 204 or other associated memory in determining a state of the portable device 108. For instance, a particular motion of the portable device 108 may indicate that the portable device 108 is not in a condition to be presented to a reading device 112, and as such, may determine to limit a function or feature of the portable device 108. In one embodiment, information from the motion sensors 224 may indicate a lack of motion associated with the portable device 108. This lack of motion may be used by an application running via the portable device 108 to enable or disable one or more features of the portable device 108.

The portable device 108 may include one or more location sensors 228. The location sensors may be configured to determine a geographical location and/or position of the portable device 108. In one embodiment, this location may be based on Global Positioning System (GPS) data provided by a GPS module of the portable device 108. In some embodiments, the location of the portable device 108 may be provided based on cell tower data, WiFi information, iBeacon information, and/or some other location information provided by a location module and/or a communications module 216 of the portable device 108. In one embodiment, the authentication of a user may be based at least partially on determining a location of the portable device 108. In some embodiments, one or more features of the portable device 108 may be controlled based on a location and/or state of the portable device 108.

In some embodiments, the portable device may include a user interface, a reader interface, and/or a network interface. The user interface may comprise one or more user input devices and/or one or more user output devices. Examples of suitable user input devices that may be included in the user interface include, without limitation, buttons, keyboards, mouse, touch-sensitive surfaces, pen, camera, microphone, etc. Examples of suitable user output devices that may be included in the user interface include, without limitation, display screens, touchscreens, lights, speakers, etc. It should be appreciated that the user interface may also include a combined user input and user output device, such as a touch-sensitive display or the like. The reader interface may correspond to the hardware that facilitates communications with the credential for the portable device 108. The reader interface may include a Bluetooth interface (e.g., antenna and associated circuitry), a Wi-Fi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, the reader interface is specifically provided to facilitate proximity-based communications with a credential via communication channel or multiple communication channels. The network interface may comprise hardware that facilitates communications with other communication devices over the communication network 128. The network interface may include an Ethernet port, a Wi-Fi card, a Network Interface Card (NIC), a cellular interface (e.g., antenna, filters, and associated circuitry), or the like. The network interface may be configured to facilitate a connection between the portable device 108 and the communication network 128 and may further be configured to encode and decode communications (e.g., packets) according to a protocol utilized by the communication network 128

If NFC is being used for the communication channel, then the reader 112 and portable device 108 may have their interfaces/antennas inductively coupled to one another at which point the reader and/or portable device 108 will authenticate or mutually authenticate with one another. Following authentication, the reader 112 may request a key or multiple keys from the portable device 108, or the portable device 108 may offer a key or multiple keys to the reader 112. Upon receiving the key(s) from the portable device 108, the reader 112 may analyze the key(s) and determine if the key(s) are valid and, if so, allow the holder/user of the portable device 108 access to the asset protected by the reader 112. It should be appreciated that the portable device 108 may alternatively or additionally be configured to analyze information received from the reader 112 in connection with making an access control decision and/or in connection with making a decision whether or not to provide key(s) to the reader 112. Examples of technologies that can be used by the portable device 108 to make an access control decision for itself are further described in U.S. Pat. No. 8,074,271 to Davis et al. and U.S. Pat. No. 7,706,778 to Lowe, both of which are hereby incorporated herein by reference in their entirety.

If, for instance, BLE or some other non-inductive protocol (e.g., Wi-Fi) is being used for the communication channel, then the reader 112 and portable device 108 may perform a discovery routine prior to pairing with one another or otherwise connecting to establish the communication channel. After the channel is established, however, the reader 112 and portable device 108 may then authenticate one another and exchange relevant information, such as the key(s), to enable an access control decision to be made. If a positive access control decision is made (e.g., it is determined that the key(s) are valid and the portable device 108 is allowed to access the asset protected by the reader 112), then the reader 112 may initiate one or more actions to enable the holder/user of the portable device 108 to access the asset protected by the reader 112.

FIG. 3 shows a data structure 300 having a device motion determination column 304, a motion type determination column 308, and a device feature control column 312. The determination of whether the device 108 is in motion, or not in motion, may be based on information received from the various sensors 220, 224, 228 of the portable device 108. As shown in FIG. 3, when a device 108 is determined to be in motion, depending on the motion type determination a number of device feature controls may be provided and/or executed by the portable device 108 and/or the feature control application running on the portable device 108. Motion types may include, but are in no way limited to, a constant motion, intermittent motion, motion pattern, and/or some other motion determined over a time period.

By way of example, when the portable device 108 is determined to be in a constant motion state M1 (e.g., a motion of the device 108 in a user's purse, bag, pocket, etc., when the user is moving, walking, jogging, running, etc.) the feature control application, for example, of the portable device 108 may determine that looking for reading devices 112 may be unsafe, impractical, and/or unwanted, etc. As used herein, looking for reading devices 112 may include responding to interrogations, scanning for reading devices 112, transmitting data from the portable device 108, providing a particular type of data (e.g., access data, identification information, credit information, user information, etc.) via the portable device 108, and/or the like. In this instance, the portable device 108 would be prevented, restricted, or otherwise disallowed from looking for readers.

As another example, a portable device 108 may be determined to include a particular pattern or path of motion M3. In this example, the feature control application may determine that the pattern M3 must match, or substantially match, a particular pattern before looking for one or more reading devices 112. For instance, a user may move a portable device 108 in a waving circular pattern before a reader 112 to enable a release of information. In this case, the portable device 108 must verify that the waving circular pattern of motion matches a release of information pattern stored in memory before it enables the release and/or transfer of information from the portable device 108.

In some embodiments, the portable device 108 may be determined to not be in motion, or still. The portable device 108 may record an amount of time that the device 108 has had no motion, or remained still. This time may be used by the feature control application in determining whether to control a device feature and/or function. By way of example, the data structure 300 may define that a device 108 must remain still (i.e., not in motion) for a particular amount of time before specific features are limited, locked, prohibited, etc. For instance, the data structure 300 shows a first timing motion type determination N1 where the device 108 has remained still for at least time X. In this case, the portable device 108 is configured to prohibit looking for readers, as defined by the device feature control field associated with N1. In some cases, a portable device 108 having access control information may be prevented from opening a door, or actuating a lock 114, when the device 108 has been still for a particular time (e.g., after the still time has passed a specific threshold condition, or value, N2, at least time Y). In some embodiments, the times shown in the data structure 300 may be equal to one another, different to one another, and/or combinations thereof. In one embodiment, one or more motion type determination associated with a motion determination may be used alone or in combination with the motion type one or more motion type determination associated with a different motion determination.

FIG. 4 shows a data structure 400 having a device lighting determination column 404, a lighting type determination column 408, and a device feature control column 412. The determination of whether the device 108 is in a lit 416, or unlit 420, state may be based on information received from the one or more device sensors 220 of the portable device 108. As shown in FIG. 4, when a device 108 is determined to be in a lit condition, depending on the lighting type determination a number of device feature controls may be provided and/or executed by the portable device 108 and/or the feature control application running on the portable device 108. Lighting types may include, but are in no way limited to, a constant light, intermittent light, light pattern, light intensity, dark threshold values, and/or some other lighting measurement determined over a time period. In some embodiments, these determinations may be made by one or more light sensors (e.g., photodetector, photocell, photosensor, etc.) associated with the portable device 108.

In some embodiments, the lighting state may indicate a condition of the device 108 and what features and/or functions should be controlled. For instance, the data structure 400 shows L1 having a constant lighting type for a period of time. This constant lighting may indicate that the light sensor of the device 108 is detecting light and has been exposed from a concealed environment. In this embodiment, the portable device 108 may be controlled to look for reading devices 112 (e.g., as if the device 108 has been removed from a pocket, purse, bag, etc. to provide payment information, access control information, or other data, etc.). It should be appreciated that the lighting determination device feature controls described in conjunction with FIG. 4 may be used alone or in combination with the motion determination device feature controls described in conjunction with FIG. 3. For example, a feature control performed by the feature control application of a device 108 may require a particular lighting type determination (e.g., L1, constant light, etc.) and a particular motion type determination (e.g., M3, motion pattern, etc.) before controlling a feature of the device 108 (e.g., looking for reading devices 112). It should be appreciated that other combinations may be made in accordance with embodiments of the present disclosure.

As another example, the image or lighting sensor of the portable device 108 may provide information that a lighting condition in proximity to the lighting sensor indicates that the lighting has not exceeded a particular light (or dark) threshold. If the portable device 108 receives information from the sensors 220 that the device 108 is in an unlit state, the feature control application may determine to not look for readers. An unlit device 108 may indicate that the device 108 is hidden, held in a pocket, being carried in a bag or purse, or otherwise concealed and not presented for reading by a reading device 112. As such, the feature control application may prevent, prohibit, or limit specific communication functions associated with the portable device 108.

Figure 5:
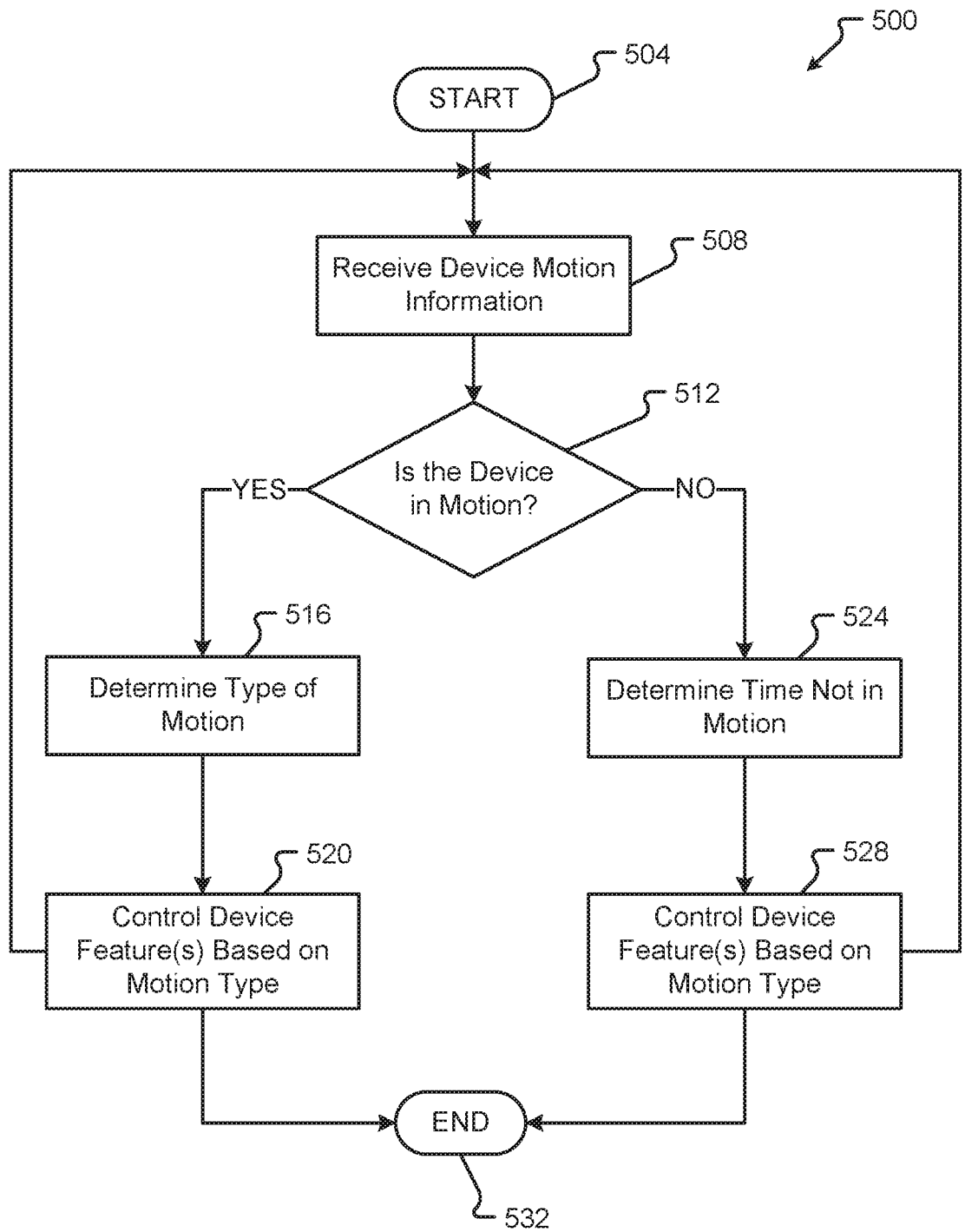
FIG. 5 is a flow chart depicting a method of controlling a device feature based on portable device sensor information in accordance with embodiments of the present disclosure.

FIG. 5 is a flow chart depicting a method 500 of controlling a device feature based on portable device sensor information in accordance with embodiments of the present disclosure. While a general order for the steps of the method 500 is shown in FIG. 5, the method 500 can include more or fewer steps or can arrange the order of the steps differently than those shown in FIG. 5. Generally, the method 500 starts with a start operation 504 and ends with an end operation 532. The method 500 can be executed as a set of computer-executable instructions executed by a computer system and encoded or stored on a computer readable medium. Hereinafter, the method 500 shall be explained with reference to the systems, components, modules, environments, software, etc. described in conjunction with FIGS. 1-4.

The method 500 begins at step 504 and proceeds by receiving device motion information from one or more sensors 220, 224, 228 associated with the portable device 108 (step 508). Motion information may include movement in a three-dimensional space, movement relative to a gravity vector, force detection, etc., and/or combinations thereof.

Next, the method 500 proceeds by determining whether the portable device 108 is in motion (step 512). In some embodiments, this determination may be made by the portable device 108 analyzing the received device motion information. When the motion information provides that the device 108 has moved beyond a predetermined threshold value, or set of values, indicating motion, the device 108 may be determined to be in motion. This threshold value may be configured such that minor movements, translations, rotations, force applications, etc., detected by the sensors 220, 224, 228 (e.g., where a user is holding the device 108 for presentation to a reading device 112, etc.) does not qualify as "in motion" (e.g., which may allow the device 108 to be read by the reading device 112, etc.).

Upon determining that the device 108 is in motion, the method 500 may continue by determining a type of motion associated with the portable device 108 (step 516). This type of motion may correspond to one or more of the motion type determinations described in conjunction with the data structure 300 of FIG. 3. The method 500 may then provide a particular control of at least one feature of the portable device 108 based at least partially on the device feature control associated with the determined type of motion (step 520). Control of a device feature may include limiting, enabling, restricting, activating, or otherwise affecting a feature and/or function of the device 108. The method 500 may return to step 508 or end at step 532.

The method 500, upon determining that the portable device 108 is not in motion, may proceed by determining a time that the portable device 108 has been still, or not in motion (step 524). This determination may be based on one or more of the motion type determinations described in conjunction with the data structure 300 of FIG. 3. The method 500 may then provide a particular control of at least one feature of the portable device 108 based at least partially on the device feature control associated with the determined time that the device 108 was not in motion (step 528). Next, the method 500 may return to step 508 or end at step 532.

In some embodiments, the method 500 may determine in steps 520 and/or 528 to control the device features based on additional criteria (e.g., other than movement criteria, etc.). For example, the control of device features may be based at least partially on a determination made regarding a lighting state or detected lighting information associated with the device as described in conjunction with FIGS. 4 and 6 in addition to the determined type of motion described above. By way of example, a portable device 108 may detect motion that matches a user walking with the portable device 108 and stopping before an access point, while this motion may indicate the user wishes to gain entry at an access point (e.g., and that the portable device 108 may be set to look for readers 112, etc.), the method 500 may require the user to remove the portable device 108 from a concealed position (e.g., being carried in a pocket, bag, etc.). Removal of the portable device 108 may be determined by a motion of the device and/or by light information detected by the portable device 108 (e.g., via a light sensor, etc.). In this example, the portable device 108 may be restricted from looking for readers until both the motion and the lighting information match a "look for readers" condition.

Figure 6:
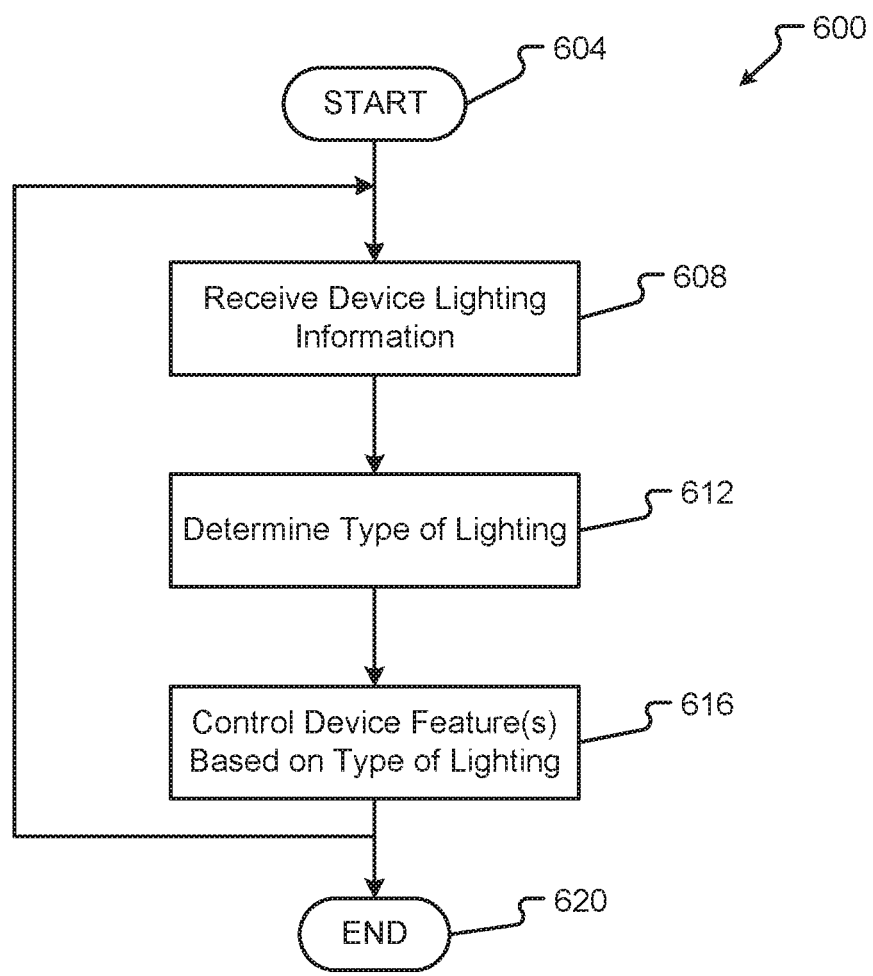
FIG. 6 is a flow chart depicting a method of controlling a device feature based on portable device sensor information in accordance with embodiments of the present disclosure.

FIG. 6 is a flow chart depicting a method 600 of controlling a device feature based on portable device sensor information in accordance with embodiments of the present disclosure. While a general order for the steps of the method 600 is shown in FIG. 6, the method 600 can include more or fewer steps or can arrange the order of the steps differently than those shown in FIG. 6. Generally, the method 600 starts with a start operation 604 and ends with an end operation 624. The method 600 can be executed as a set of computer-executable instructions executed by a computer system and encoded or stored on a computer readable medium. Hereinafter, the method 600 shall be explained with reference to the systems, components, modules, environments, software, etc. described in conjunction with FIGS. 1-5.

The method 600 begins at step 604 and proceeds by receiving device lighting information from at least one device sensor 220 associated with the portable device 108 (step 608). In one embodiment, the lighting information may be analyzed by the feature control application running via the portable device 108. Lighting information can include any illumination, intensity of illumination, luminous intensity, power emitted by one or more light sources, an energy associated with at least one light source, combinations thereof, and/or the like.

Next, the method 600 may continue by determining the type of lighting associated with the lighting information (step 612). This type of lighting may correspond to one or more of the lighting type determinations described in conjunction with the data structure 400 of FIG. 4. In some embodiments, determining the type of lighting may include identifying a particular lighting source in proximity to the portable device 108. The identification of the particular lighting source may be used by the feature control application to control at least one feature of the portable device 108. In one embodiment, determining the type of lighting may include determining whether an intensity or energy of the detected light meets or exceeds a particular lighting threshold value. Additionally or alternatively, determining the type of lighting may include determining whether an intensity or energy of the detected light does not meet or exceed a particular lighting threshold value.

In any event, the result of the determination may be used by the feature control application in determining whether to control one or more features and functions of the portable device 108 (step 616). In some embodiments, the method 600 may determine in step 616 to control the device features based on additional criteria. For instance, the control of device features may be based at least partially on a determination made regarding a motion of the device as described in conjunction with FIGS. 3 and 5 in addition to the determined type of lighting described above. The method 600 may return to step 608 or end at step 620.

The exemplary systems and methods of this disclosure have been described in relation to portable devices, systems, and methods in an access control system. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should, however, be appreciated that the present disclosure may be practiced in a variety of ways beyond the specific detail set forth herein. Moreover, it should be appreciated that the methods disclosed herein may be executed via a portable device, a wearable device, a reading device, a communication device, and/or an access server of an access control system, etc.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Embodiments include a method, comprising: receiving, via one or more sensors of a portable device, motion information corresponding to a movement of the portable device over a time period; determining, via the portable device and based on the motion information, whether the portable device is in motion or still; determining, via the portable device and when the portable device is determined to be in motion, a type of motion associated with the motion; and controlling, automatically by a feature control application running via the portable device and when the portable device is determined to be in motion, a feature of the portable device based at least partially on the type of motion.

Aspects of the above method further comprise determining, via the portable device and when the portable device is determined to be still, a time the portable device has been still; and controlling, automatically by the feature control application running via the portable device and when the portable device is determined to be still, a feature of the portable device based at least partially on the time the device has been still. Aspects of the above method include wherein controlling the feature of the portable device further comprises: preventing an information communication feature of the portable device when the portable device is still. Aspects of the above method include wherein controlling the feature of the portable device further comprises: selecting an advertisement rate proportional to an amount of movement of the portable device such that the amount of movement of the portable device when determined to be in motion is greater than the advertising rate of the portable device when determined to be still, and wherein the advertise rate corresponds to an interval of time between advertising an availability of the portable device for communications with one or more reading devices. Aspects of the above method include wherein controlling the feature of the portable device further comprises: adjusting an advertisement packet to include information corresponding to the type of motion and an amount of movement of the portable device. Aspects of the above method include wherein controlling the feature of the portable device further comprises: adjusting a radio frequency (RF) transmission power of advertisement packets sent by the portable device based on the motion of the portable device. Aspects of the above method include wherein the RF transmission power is increased based on an amount of movement of the portable device while the portable device is in an RF field of a reading device or based on the motion information matching a motion pattern indicating an open command. Aspects of the above method include wherein controlling the feature of the portable device further comprises: preventing an information communication feature of the portable device when the portable device is in motion. Aspects of the above method include wherein the information communication feature corresponds to looking for at least one reading device in an access control system. Aspects of the above method include wherein the information communication feature corresponds to scanning for a reading device in a credit payment system. Aspects of the above method include wherein the portable device includes radio frequency identification (RFID) components and preventing the information communication feature of the portable device includes disabling at least one of the RFID components from communicating with an RFID reader. Aspects of the above method include wherein the information communication feature corresponds to a communication response feature, and wherein the communication response feature allows the portable device to respond to a scanning query provided by at least one reading device. Aspects of the above method include wherein the information communication feature corresponds to a communication availability advertising feature, and wherein the communication availability advertising feature is configured to advertise an availability of the portable device for communications with one or more reading devices. Aspects of the above method include wherein controlling the feature of the portable device based at least partially on the time the device has been still further comprises: preventing an information communication feature of the portable device when the portable device has been still for a period of time greater than a stored time threshold value. Aspects of the above method include wherein the information communication feature corresponds to looking for at least one reading device in an access control system. Aspects of the above method include wherein the information communication feature corresponds to scanning for a reading device in a credit payment system. Aspects of the above method include wherein preventing the information communication feature of the portable device prohibits the portable device from responding to communications initiated by a reading device. Aspects of the above method include wherein the portable device includes radio frequency identification (RFID) components and preventing the information communication feature of the portable device includes disabling at least one of the RFID components from communicating with an RFID reader. Aspects of the above method include wherein preventing the information communication feature of the portable device disables the portable device from advertising services associated with the portable device.

Embodiments include a non-transitory computer readable medium having stored thereon instructions that, when executed by a processor, cause the processor to perform the above method or methods.

Embodiments include a method, comprising: receiving, via one or more sensors of a portable device, lighting information including an intensity of light in proximity to the portable device; determining, via the portable device and based on the lighting information, whether the portable device is in an exposed or concealed environment; and controlling, automatically by a feature control application running via the portable device and when the portable device is determined to be in a concealed environment, a feature of the portable device based at least partially on the lighting information.

Aspects of the above method include wherein controlling the feature of the portable device further comprises: preventing an information communication feature of the portable device when the portable device is determined to be in a concealed environment. Aspects of the above method include wherein the portable device is in a concealed environment when the intensity of light in proximity to the portable device is below a predetermined light threshold value and wherein the portable device includes radio frequency identification (RFID) components and preventing the information communication feature of the portable device includes disabling at least one of the RFID components from communicating with an RFID reader.

Embodiments include a non-transitory computer readable medium having stored thereon instructions that, when executed by a processor, cause the processor to perform the above method or methods.

Embodiments include a portable device, comprising: a processor; at least one motion sensor; and a memory having stored thereon instructions that, when executed by the processor, cause the processor to: receive, via the at least one motion sensor, motion information corresponding to a movement of the portable device over a time period; determine, via the processor and based on the motion information, whether the portable device is in motion or still; determine, via the processor and when the portable device is determined to be in motion, a type of motion associated with the motion; and control, via the processor and when the portable device is determined to be in motion, a feature of the portable device based at least partially on the type of motion.

Aspects of the above method further comprise: at least one radio frequency identification (RFID) component, and wherein controlling the feature of the portable device further comprises preventing an information communication feature of the portable device by disabling the at least one RFID component from communicating with an RFID reader.

Any of the steps, functions, and operations discussed herein can be performed continuously and automatically.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

What is claimed is:

1. A method, comprising:
    receiving, via one or more sensors of a portable device, motion information corresponding to a movement of the portable device over a time period;
    determining, via the portable device and based on the motion information, whether the portable device is in motion or still;
    determining, via the portable device and when the portable device is determined to be in motion, a type of motion associated with the motion;
    controlling, automatically by a feature control application running via the portable device and when the portable device is determined to be in motion, a feature of the portable device based at least partially on the type of motion; and
    preventing, automatically by the feature control application and when the portable device is determined to be still for a period of time greater than a stored time threshold value, an information communication feature of the portable device such that the portable device is restricted from responding to communications initiated by a reading device.

2. The method of claim 1, further comprising:
    determining, via the portable device and when the portable device is determined to be still, a time the portable device has been still; and
    controlling, automatically by the feature control application running via the portable device and when the portable device is determined to be still, a feature of the portable device based at least partially on the time the device has been still.

3. The method of claim 1, wherein controlling the feature of the portable device further comprises:
    selecting an advertisement rate proportional to an amount of movement of the portable device such that the amount of movement of the portable device when determined to be in motion is greater than the advertising rate of the portable device when determined to be still, and wherein the advertisement rate corresponds to an interval of time between advertising an availability of the portable device for communications with one or more reading devices.

4. The method of claim 1, wherein controlling the feature of the portable device further comprises:

adjusting an advertisement packet to include information corresponding to the type of motion and an amount of movement of the portable device.

5. The method of claim 1, wherein controlling the feature of the portable device further comprises:
adjusting a radio frequency (RF) transmission power of advertisement packets sent by the portable device based on the motion of the portable device.

6. The method of claim 5, wherein the RF transmission power is increased based on an amount of movement of the portable device while the portable device is in an RF field of a reading device or based on the motion information matching a motion pattern indicating an open command.

7. The method of claim 1, wherein controlling the feature of the portable device further comprises:
preventing an information communication feature of the portable device when the portable device is in motion.

8. The method of claim 7, wherein the information communication feature corresponds to looking for at least one reading device in an access control system.

9. The method of claim 7, wherein the information communication feature corresponds to wirelessly communicating with a reading device in a credit payment system.

10. The method of claim 7, wherein the portable device includes radio frequency identification (RFID) components and preventing the information communication feature of the portable device includes disabling at least one of the RFID components from communicating with an RFID reader.

11. The method of claim 7, wherein the information communication feature corresponds to a communication response feature, and wherein the communication response feature allows the portable device to respond to a scanning query provided by at least one reading device.

12. The method of claim 7, wherein the information communication feature corresponds to a communication availability advertising feature, and wherein the communication availability advertising feature is configured to advertise an availability of the portable device for communications with one or more reading devices.

13. The method of claim 1, wherein controlling the feature of the portable device further comprises:
preventing the information communication feature of the portable device from transmitting when the portable device has been still for the period of time greater than the stored time threshold value.

14. The method of claim 13, wherein the information communication feature corresponds to scanning for the reading device in a credit payment system.

15. The method of claim 13, wherein the portable device includes radio frequency identification (RFID) components, wherein the reading device comprises an RFID reader, and wherein preventing the information communication feature of the portable device includes disabling at least one of the RFID components.

16. The method of claim 13, wherein preventing the information communication feature of the portable device disables the portable device from advertising services associated with the portable device.

17. A non-transitory computer readable medium having stored thereon instructions that, when executed by a processor, perform the method of claim 1.

* * * * *